March 17, 1959     P. M. LONG     2,878,028
ADJUSTABLE DOLLY
Filed Aug. 15, 1957
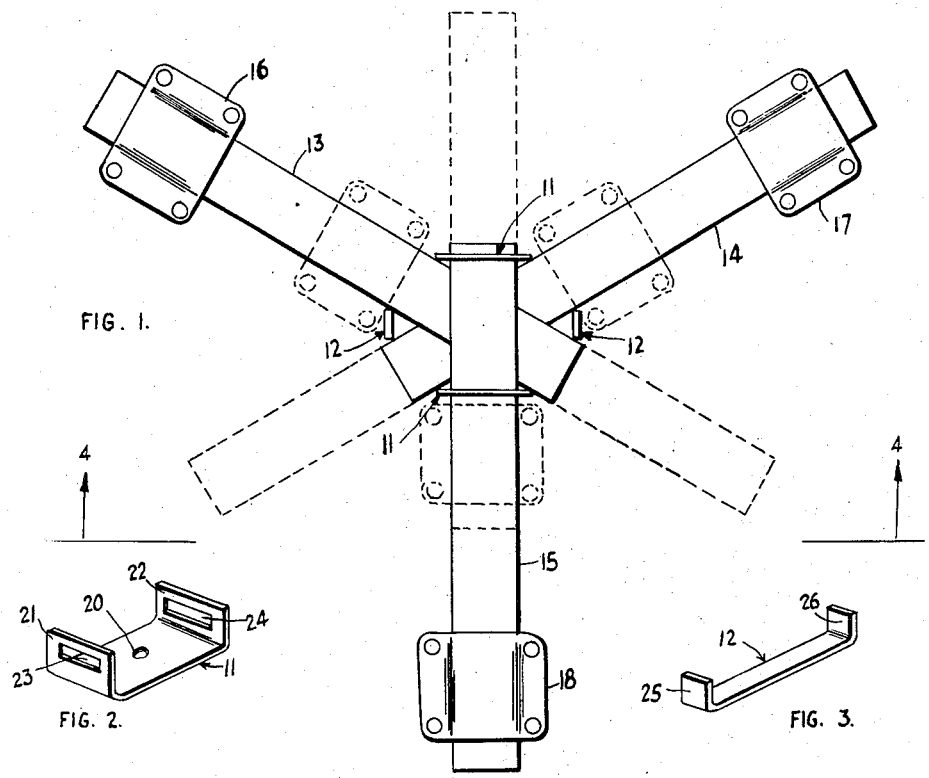
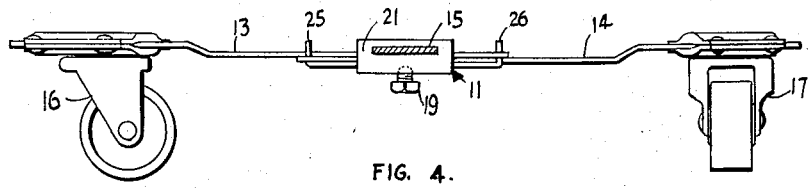
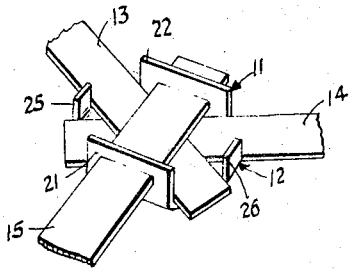
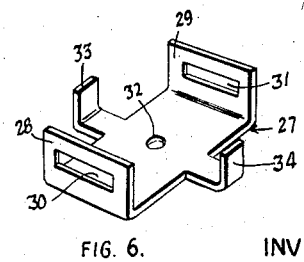
INVENTOR
PAUL M. LONG.
BY *Robert L. Dunn*
ATTORNEY.

United States Patent Office 2,878,028
Patented Mar. 17, 1959

2,878,028
ADJUSTABLE DOLLY

Paul Manley Long, Menlo Park, Calif., assignor to A. B. A. Manufacturing Co., Redwood City, Calif.

Application August 15, 1957, Serial No. 678,296

3 Claims. (Cl. 280—35)

This invention relates to dollies and deals with a dolly having adjustments for supporting loads of different dimensions.

The invention to be hereinafter described and claimed has been designed for use in a nursery for supporting and transporting heavy potted plants, such as shrubbery and the like, but it will be obvious that the same dolly may find usefulness for conventional dolly purposes, such as furniture moving, trucking, freighting, etc.

The primary object of the present invention is the provision of a dolly on which the load supporting means may be expanded to accommodate the dolly to different size loads. In nursery work, particularly, this feature is advantageous since it permits the dolly to be used on large or small tubs carrying plants or shrubs.

Another object is to provide a dolly wherein a quick adjustment may be made in the dimension of the load supporting means.

Still another object is the provision of a dolly of the character described wherein the cost of manufacture may be held at a minimum and a sturdy dolly may be made out of strap iron without the cost of castings or machine work.

Briefly stated, the invention amounts to forming a three point support on swivelable casters wherein the casters are carried at the ends of arms which in turn are slidably mounted in a central member for sliding adjustment therein, together with means for clamping the arms in various fixed positions on the central member. The whole assembly may be made from strap iron with the exceptions of the casters which are of standard construction and fixed on the arms in any suitable manner.

Other objects and advantages will become apparent as the description proceeds in conjunction with the drawing in which:

Fig. 1 is a plan view of the dolly showing the full extended position in solid lines and the contracted position in dotted lines;

Fig. 2 is a perspective view of the central member;

Fig. 3 is a perspective view of the spacer member that spaces the arms angularly;

Fig. 4 is a section on line 4—4 of Fig. 1;

Fig. 5 is a fragmentary perspective view of the intersection of the arms at the central member; and Fig. 6 shows another form part of my invention may take.

Referring to the drawing, and particularly to Fig. 1, it can be seen that my invention consists of a central member, generally designated 11, a spacer member, generally designated 12, three arms 13, 14 and 15, which are identical in construction, three swivelable casters 16, 17 and 18 suitably mounted on the arms 13, 14 and 15 respectively, together with a small stud bolt 19 screw threadedly mounted on the central member 11 in a hole 20 for the purpose of locking the whole assembly together.

The manner of assembling and locking the parts together is as follows: It will be noted that the central member 11 has upstanding flanges 21 and 22 at the ends and these flanges have slots 23 and 24 respectively.

It can be observed by referring to Fig. 3 that the spacer likewise has upstanding flanges 25 and 26 at the ends thereof, but that these flanges are blank, that is, they have no slots in them and are somewhat narrower than the flanges on the central member. To assemble the unit, it is preferable to first lay the spacer 12 across the central member 11 substantially at a right angle thereto and to then pass one of the arms, in this case, the arm 15 through the slots 21 and 22 in the member 11. The arm 13 is then passed under the arm 15 between the flanges 21 and 22 of the central member 11. The arm 14 is then passed under the arm 13 and likewise through the member 11. In passing the arms 13 and 14 through the member 11 they are crisscrossed and each passes on opposite sides of the flanges 25 and 26 on the spacer 12. The dimensions of the spacer and the central member 11 have been calculated to provide substantially even angular spacing of the arms in the member 11. The arms in this position are free to slide backward and forward but not angularly in the member 11. They may be disposed regularly or unevenly with respect to length and locked in position by tightening the stud bolt 19. The construction lends itself peculiarly well for purposes of manufacturing in that the whole unit may be made from common strap material and requires no machine work or castings of any description. Although I have shown the casters as being strapped on the arms in fixed positions, they could be welded to the arms equally as well and derive all the benefits of my invention. There are other modifications and alterations that may be made, such as placing the flanges 25 and 26 on the spacer 12, directly on the member 11 at right angles to the flanges 21 and 22, see Fig. 6. Here, I have shown this particular form for the central member. In this form the member 27 carries end flanges 28 and 29 with slots 30 and 31 respectively, the same as the member 11. It also has a screw threaded hole 32 corresponding to the hole 20 in the member 11. However, instead of using a separate piece like the piece 12 with its flanges 25 and 26, I form flanges 33 and 34 as part of the member 27, thereby eliminating one piece of material. The results are identical in use.

I claim:

1. A dolly comprising three arms, a caster mounted near one end of each of said arms, a central member for holding said arms in spaced angular relation to each other, said central member having a pair of spaced upstanding flanges substantially parallel to each other with a slot in each of said flanges to slidably receive one of said arms, said other two arms being held by said first mentioned central member under said one of said arms in crisscross relation, a second central member between said first mentioned central member and said other two arms having spaced upstanding flanges substantially parallel to each other adapted to be inserted between the edges of said other two arms to maintain a fixed angular relation therebetween, and means for locking all of said arms in various fixed positions.

2. A dolly comprising three arms, each arm having a caster mounted near one end thereof, a central member for slidably and collectively holding the other ends of said arms in fixed angular relation to each other, said central member having a first pair of spaced upstanding flanges substantially parallel to each other, a second pair of spaced upstanding flanges substantially parallel to each other at substantially a right angle to said first mentioned pair of flanges, one of said pairs of flanges having a slot in each flange to slidably receive one of said arms, the other pair of flanges being adapted to extend between the edges of the other two of said arms and hold them in a crisscross relation in said central member, and means for locking all of said arms in various fixed positions in said central member.

3. A dolly having three radial arms, means for adjusting the length of each of said arms, said means including a central member having two sets of upstanding flanges substantially at right angles to each other, one set having a slot in each flange to slidably receive one of said arms, the other two arms being held in crisscross relation between said first mentioned arm and said central member by the second set of flanges extending between the edges of said crisscrossed arms, and means for locking all of said arms in various fixed positions in said central member.

References Cited in the file of this patent

UNITED STATES PATENTS

| | | |
|---|---|---|
| 1,330,376 | House | Feb. 19, 1920 |
| 1,887,067 | Pehrsson | Nov. 8, 1932 |